United States Patent [19]
Schlotfeldt

[11] 3,763,597
[45] Oct. 9, 1973

[54] APPARATUS FOR PRODUCING CONTACT LENSES

[76] Inventor: Walter A. Schlotfeldt, 434 Wesley Dr., Addison, Ill.

[22] Filed: Oct. 13, 1971

[21] Appl. No.: 188,714

[52] U.S. Cl. .......... 51/33 R, 51/215 H, 51/215 VE, 51/284
[51] Int. Cl. ............................................. B24b 13/02
[58] Field of Search ..................... 51/215 R, 215 H, 51/215 HM, 215 CP, 215 E, 215 M, 215 UE, 216 R, 216 LP, 105 LG, 108 R, 131, 134, 33 R, 33W, 215, 33

[56] References Cited
UNITED STATES PATENTS
2,632,288  3/1953  Diller............................. 51/105 LG
1,438,909  12/1922  Fink................................ 51/216 LP Primary Examiner—Donald G. Kelly
Attorney—George H. Gerstman

[57] ABSTRACT

Apparatus for producing contact lenses, in which the cutting tool for cutting the base curve into a contact lens blank pivots about a point that is movable to vary the radius of curvature of the cutting tool, without moving the relative positions of the cutting tool tip and the blank. The blank with the base curve cut thereon is conveyed to supporting structure so that the base curve will be polished as it faces upwardly. The lens blank is held by a vacuum chuck during cutting of the power curve, and the power curve is polished with a wood polishing device.

5 Claims, 26 Drawing Figures

Patented Oct. 9, 1973

Patented Oct. 9, 1973

Patented Oct. 9, 1973

Patented Oct. 9, 1973 3,763,597

APPARATUS FOR PRODUCING CONTACT LENSES

BACKGROUND OF THE INVENTION

The present invention relates to an improved apparatus for producing contact lenses.

Contact lenses are generally produced by utilizing precision tools to cut both surfaces of the lens and polishing the lens. Contact lenses have been fabricated by molding techniques, but molding of such lenses has been found disadvantageous primarily because of warping problems.

In the prior art fabrication of contact lenses using precision tooling techniques, a plastic lens blank, in the form of a disc, is provided. The posterior or base curve is generated on the blank with a diamond cutting tool and is cupped out to substantially the outer dimension of the disc. The base curve is then polished and, subsequently, the anterior or power curve is cut on the other side of the blank with a diamond cutting tool, according to a presciption. The power curve is polished and, subsequently, a peripheral curve and an intermediate peripheral curve are cut by a diamond cutting tool. The peripheral curves are buffed to complete the lens.

In cutting the base curve using prior art techniques, it is generally necessary to measure the depth of the curve (from the nadir of the curve to the plane in which its circumference lies) each time the radius of the base curve is changed. This is because in order to vary the radius of the base curve, the diamond cutting tool is removed and hence the depth is changed.

One embodiment of the present invention concerns an apparatus which permits the radius of the base curve to be changed without varying the depth of the base curve. In order to achieve this result, the pivot point upon which the diamond cutting tool pivots is moved with respect to the diamond tool without moving the relative positions of the cutting tool tip and the blank. In this manner, the depth will not vary, although the radius of curvature of the base curve can be varied as desired.

Using typical prior art fabrication techniques, the lens blank having the base curve cut therein is then manually inserted into a collet and a rotating polishing tool is brought into engagement with the curved surface. Typically the polishing head extends upwardly and the lens blank is brought downwardly against it by a polishing machine which pivots the lens blank while the polishing head is rotating. It is apparent that manual insertion of the lens blank into the collet is necessary using prior art techniques and it is difficult to apply any polishing compound to the base curve which faces downwardly. In one embodiment of the present invention, an automatic base curve polishing apparatus is provided which feeds the lens blank (having the base curve cut therein) to a platform where the base curve faces upwardly and a downwardly facing polishing tool is utilized for engaging the base curve. After the blank is polished, it is automatically ejected into an appropriate receptacle.

In order to avoid substantial manual processing of the lens blank, it is desirable that the lens blank be other than a typical disc. In one embodiment of the present invention, there is provided a lens blank which comprises a generally disc-shaped member formed of plastic material having a base curve on one side thereof and a central protuberance extending from the other side thereof. The central protuberance is useful in enabling apparatus to engage and maintain in place the lens blank for processing by the apparatus of the present invention, without the necessity of substantial manual handling.

The delicate fitting of a lens blank into a collet which holds the lens blank during the cutting of the power curve by a diamond cutting tool is time consuming and deleterious to an efficient operation. Therefore, in one form of the present invention, the apparatus which holds the lens blank during cutting of the power curve comprises vacuum means which has an outlet nozzle for communication with the base curve side of the lens blank. In this manner, an evacuated volume is formed and defined by the nozzle and the concavity of the base curve, thereby retaining the lens blank in position against the nozzle during cutting of the power curve.

From the foregoing, it can be seen that an object of the present invention is to provide apparatus for fabricating contact lenses in a manner which requires relatively little manual handling and is substantially automated.

Other objects and advantages of the present invention will become apparent from the following description, claims and drawings.

BRIEF DESCRIPTION OF THE INVENTION

In the illustrative embodiment, the base curve of a contact lens blank is cut by positioning the cutting tip of a cutting tool at a predetermined location with respect to the blank. Means are provided for pivoting the cutting tool about a pivot point and means are provided for moving the pivot point to vary the radius of curvature of the cutting tool tip without moving the relative positions of the cutting tool tip and the blank.

In one form of the invention, the contact lens blank comprises a generally disc-shaped member formed of plastic material and having a base curve on one side thereof and a central protuberance extending from the other side thereof.

In the illustrative embodiment, the base curve is polished by providing means for underlying and supporting the contact lens blank with the base curve facing upwardly. Rotating polishing means for polishing the base curve include a downwardly extending polishing tool for engaging the base curve. Means are provided for conveying the lens blank to the supporting means, which supporting means includes a vertically movable pedestal within a channel with a conveyor being positioned to convey a lens blank to the channel whereupon the blank will overlie the pedestal.

In cutting the power curve in accordance with the principles of the present invention, vacuum means are provided for holding the lens blank during the power curve cutting, with the vacuum means having an outlet nozzle for communication with the base curve side of the lens blank so that an evacuated volume is formed and defined by the nozzle and the concavity of the base curve, thereby retaining the blank in position against the nozzle during cutting of the power curve.

In accordance with the illustrative embodiment, the power curve is polished by a porous, relatively soft member, such as a wood member having a polishing surface conforming to the shape of the power curve and essentially consisting of wood being porous enough to become at least partially receptive to a liquid polishing compound.

In accordance with the present invention, the peripheral curve is cut utilizing a rotating base member with a tool holder located on the base member. Means are provided for permitting movement of the lens blank holder in a lateral direction, and camming means are carried by the base member for camming the holder to move in the lateral direction, during a portion of rotation of the base member, to cut the peripheral curve in a predetermined manner. The width and radius of the peripheral curve are selected according to known physiologic criteria. The peripheral curve can have a single radius or an aspheric radius.

The edge of a substantially finished lens is polished in accordance with the principles of the present invention, by apparatus which includes means for holding the contact lens at its central portion on both sides thereof, with the holding means being rotated during polishing. A cylindrical polishing member is provided and is rotatable about an axis perpendicular to the axis of the holding means. Means are provided for moving the polishing member back and forth in an arcuate manner about the edge of the lens.

A more detailed explanation of the invention is provided in the following description and claims, and is illustrated in the accompanying drawings.

DETAILED DESCRIPTION OF THE ILLUSTRATIVE EMBODIMENT

Figure 1:
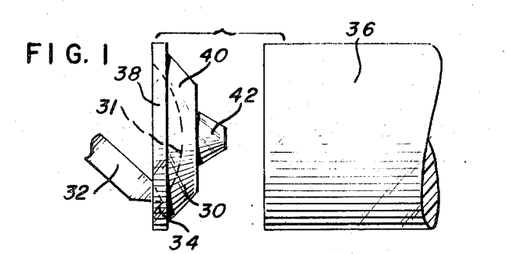
FIGS. 1–7 are diagrammatic views of the various steps in fabricating a contact lens in accordance with the principles of the present invention.

Referring to the drawings, FIG. 1 shows a lens blank 30 having a base curve 31 cut by means of cutting tool 32 having a diamond tip 34. Lens blank 30 is cut from plastic rod 36, as will be described below, and comprises a generally disc-shaped member having a peripheral rim 38, an inclined body portion 40, and a central extending protuberance 42. A cross-sectional view of the lens blank 30 is shown in FIG. 2.

Figure 2:
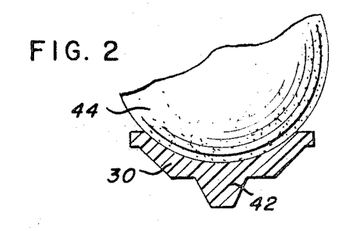
Figure 3:
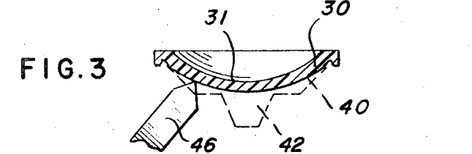

FIG. 2 shows lens blank 30 being polished by member 44, while FIG. 3 shows the cutting of the power curve on the lens blank. In FIG. 3 there is shown a schematic representation of a cutting tool 46 cutting the power curve on a lens blank 30, which blank originally takes the configuration shown in dashed line and which is reduced to the configuration shown in full line.

Figure 4:
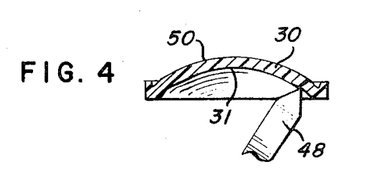

The schematic representation shown in FIG. 4 is a cutting tool 48 cutting the peripheral curve on lens blank 30, in which the power curve 50 and the base curve 31 have already been cut. After the peripheral curve is formed, referring to FIG. 5, the lens blank 30 is cut by means of a suitable cutting device employing movable punch 52 and stationary die 54, to cut a selected portion off the lens blank. The power curve 50 of blank 30 is polished by a suitable polishing member 58, as shown schematically in FIG. 7, and the edge of the lens is then polished by a rotating polishing member 56, as schematically shown in FIG. 6.

Figures 5, 6, 7, 8:
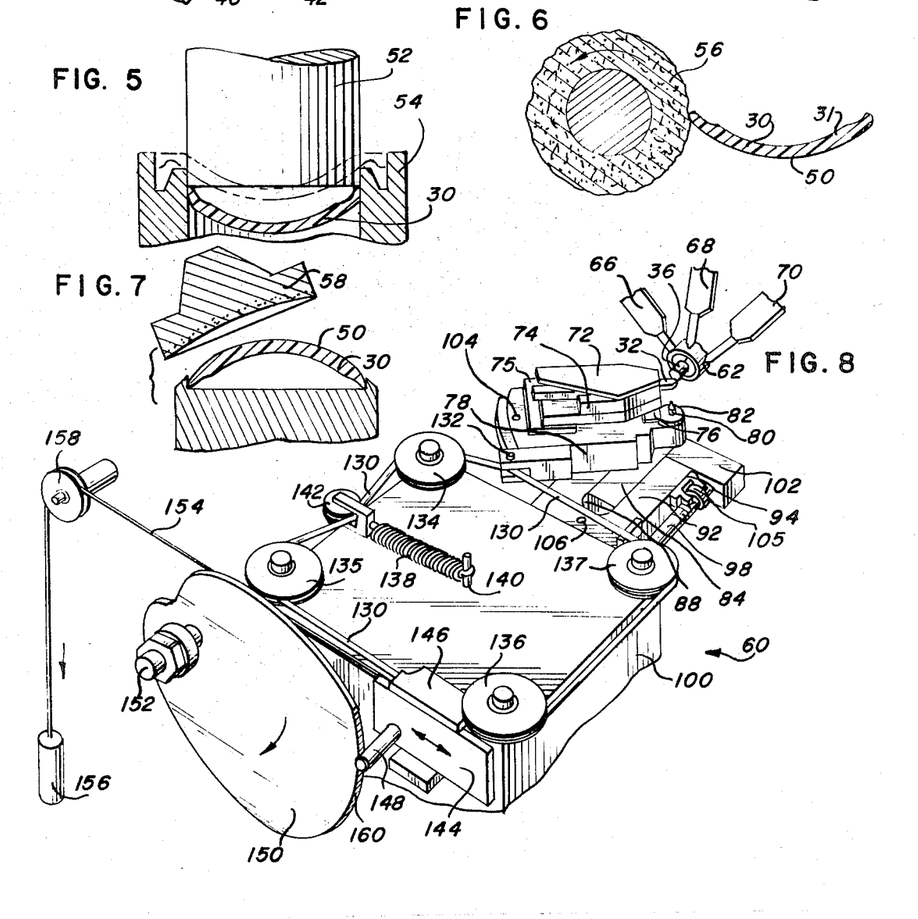
FIG. 8 is a fragmentary, perspective view of a base curve cutting apparatus in accordance with the principles of the present invention.
Figure 9:
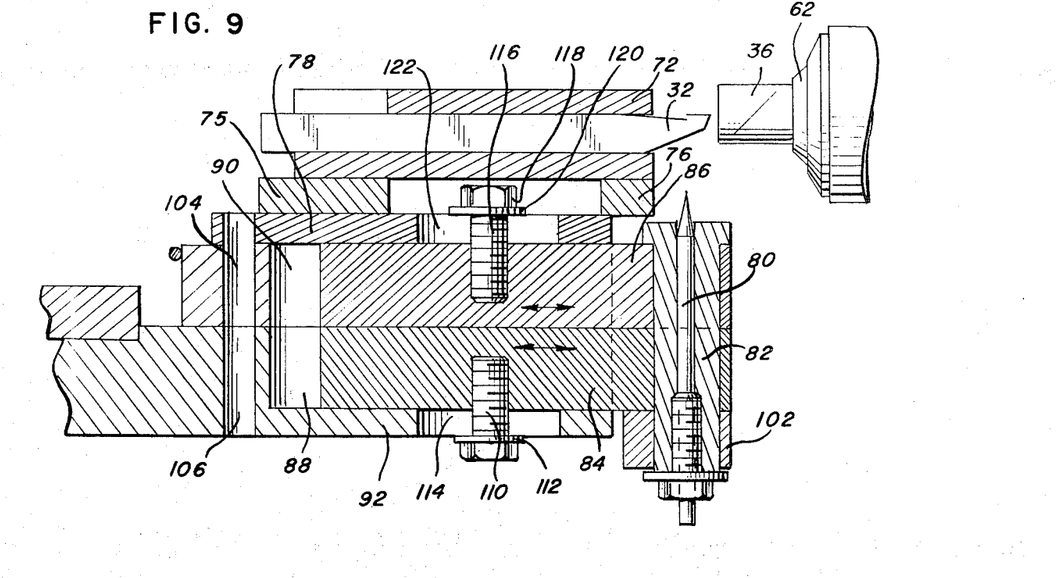
FIG. 9 is an enlarged, cross-sectional elevation of a portion thereof.
Figure 10:
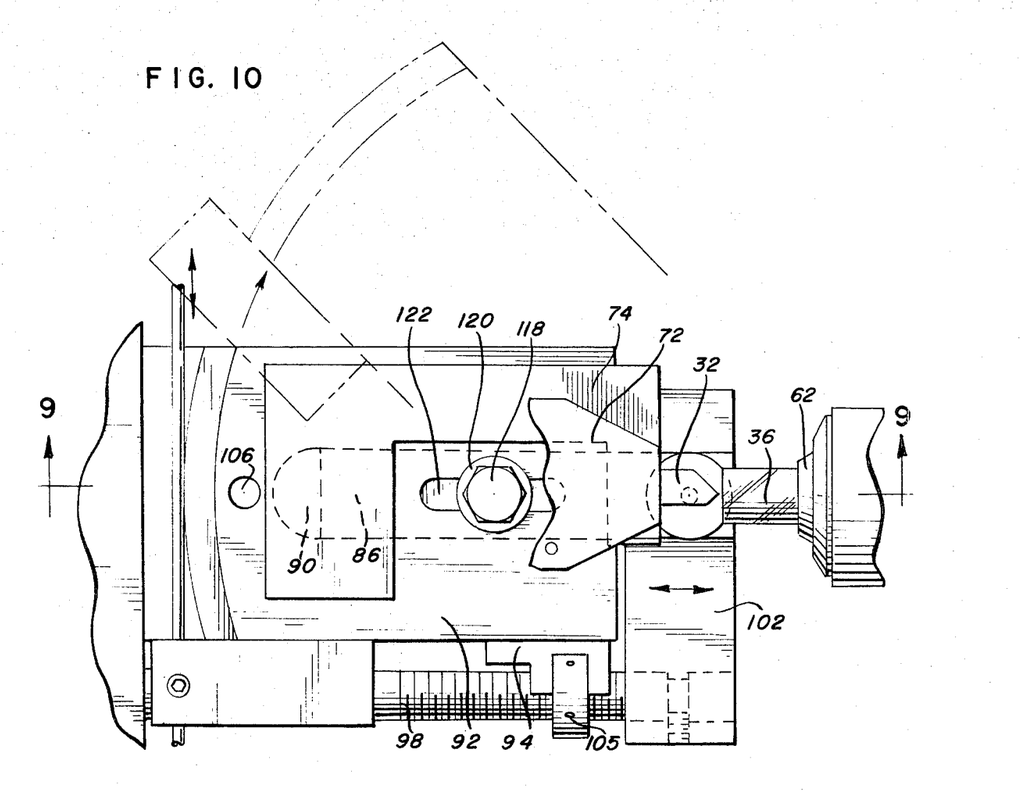
FIG. 10 is a top plan view of the device of FIG. 9.

THE BLANK FORMING APPARATUS (FIGS. 8–10)

An apparatus generally referred to by reference numeral 60 and illustrated in FIGS. 8–10, is utilized to form a lens blank in accordance with the principles of the present invention. Apparatus 60 includes a bushing 62 through which a rod 36 is advanced. Rod 36 is formed of a suitable plastic material, as is well-known in the art, for forming contact lenses. Rod 36 is advanced in predetermined increments and is acted upon by a trio of tool members 66, 68 and 70 to form rim 38, inclined portion 40, and projection 42, as most clearly shown in FIG. 1. Tools 66, 68 and 70 are programmed to operate upon rod 36 after the base curve 31 has been cut by tool 32.

Tool 32 is clamped by means of a tool holder including an upper plate 72 and a lower plate 74 which are connected to pedestals 75 and 76 which pedestals are fastened to and ride with pivotal base member 78. Base member 78 is pivotable about pivot pin 80 which can be moved laterally with respect to base member 78, as will be explained below.

Pivot pin 80 is fastened by suitable fastening means, such as a threaded member and nut arrangement (as shown in FIG. 9), to pivot carrier 82 which pivot carrier is fastened to lower slider 84. Pivot carrier 82 is also fastened to upper slider 86. Sliders 84 and 86 are adapted to slide within their respective slots 88 and 90 when bolts 110 and 116 are loosened. Slot 88 is defined by member 92 which is fixed and carries a thumb-wheel holder 94. Slot 90 is defined by member 78.

A threaded rod 98 is fastened between main drive support member 100 and slider drive member 102. Threaded member 98 carries a thumb-wheel 105 thereon which, when turned, moves member 102 which is fastened to slider 84. However, member 102 cannot move unless bolt 110 is released.

In order for pivot pin 80 to be moved while tool 32 remains stationary, sliders 86 and 84 must be aligned. To accomplish alignment of sliders 86 and 84, member 78 defines an aperture 104 while member 92 defines an aperture 106. When apertures 104 and 106 are aligned, a pin can be inserted therein to couple the apertures and sliders 86 and 84 will be in alignment to allow thumb-wheel 105 to be turned, thereby moving member 102 to move the sliders 86, 84 and the attached pivot pin 80.

In order to prevent movement of tool 32 and its connected structure 72, 74, 75, 76 and 78 with respect to slider 86, a bolt 116 threadedly engages slider 86 with the head 118 of bolt 116 lying within the opening defined by pedestals 75, 76 and clamping a washer 120 against an upper wall of member 78 which defines a slot 122 in member 78. Further, to prevent movement of members 102 and 84 with respect to slider 84, a bolt 110 threadedly engages lower slider 84 and clamps a washer 112 against an undersurface of member 92 defining a slot 114 in member 92. It can thus be seen that in order for sliders 86, 84 to slide within slots 90, 88, it will be necessary to loosen bolts 116, 110 to release the washers 120, 112 from clamping engagement with the surfaces defining slots 122, 114.

In order for member 78 carrying tool 32 to pivot about pin 80, in a manner so that tool 32 oscillates in a predetermined mode to cut the base curve 31 on rod 36, a driving system is carried by member 100. The driving system comprises a wire 130 which is fastened to member 78 by fastening means 132 and which engages the outside of pulleys 134, 135, 136 and 137, which pulleys are rotatably fastened to member 100. Tension is provided on wire 130 by means of a tension spring 138 which is affixed to member 100 at 140 and which biases the underside of a pulley 142 against wire 130.

An oscillating follower 144 is positioned adjacent member 100 and is fastened to wire 130 by flange 146 so that oscillation of follower 144 will cause equivalent movement of wire 130. Follower 144 carries an extending pin 148 which engages the surface of eccentric cam 150 having a shaft 152 eccentrically located with respect to the cam and which shaft is driven by a suitable electric motor. A wire 154 is connected at one end thereof to follower 144 and has a weight 156 connected to the other end thereof, with the wire 154 being drawn over a fixed pulley 158. Wire 154 and its associated weight 156 are utilized to bias follower 144 and its associated pin 148 against the end surface of cam 150, as shown in FIG. 7. Hence pin 148 will tend to follow surface 160 of cam 150, thereby forcing follower 144 to oscillate thereby inducing equivalent oscillation in member 78.

It can be seen that the point about which tool 32 pivots can be moved without changing the distance between the tip of tool 32 and the end surface of rod 36.

To move pivot 80, member 78 is pivoted so that hole 104 aligns with hole 106 and a pin is inserted therein to maintain member 78 in fixed arrangement with member 92. Bolts 110 and 116 are loosened and thumb-wheel 105 can then be turned to move sliders 84 and 86 together, with their associated pivot carrier 82, thereby changing the pivot of tool 32. When pivot 80 is in the proper position, bolts 110 and 116 are retightened, the pin is removed from holes 104, 106 and cam 150 can be driven to oscillate holder 78 with respect to member 92 and with respect to the workpiece rod 36 while rod 36 is rotating. After a predetermined number of oscillations cause the base curve 31 to be cut into rod 36, tools 66, 68 and 70 will operate upon rod 36 to form blank 30, inclined portion 40 and projection 42, and to sever the formed lens blank 30 from the remaining portion of the rod within the chuck 62. The lens blank 30 is now ready for the base curve to be polished.

BASE CURVE POLISHING APPARATUS (FIGS. 11–14)

An automatic apparatus for polishing the base curve of a lens blank is illustrated in FIGS. 11–14. The apparatus is mounted on a base 170 and includes a chute 172 into which are placed a number of lens blanks 30 with the base curve facing the upper surface of the chute 172. Lens blanks 30 drop to a support 174 where several blanks are aligned for positioning onto movable pedestal 176 which rides within a channel 177. When pedestal 176 is in its lower position, it permits a lens blank 30 to be located thereon with the projection 42 of the lens blank lying within a recess 178 defined by the pedestal at its top surface thereof and centrally located therewith. Pedestal 176 defines a central bore 175 through which a movable rod 179 extends. Referring to FIG. 12A, the top of movable rod 179 has an indent 181 to receive projection 42 of lens blank 30. When pedestal 176 is in its lowered position, blank 30 is pushed through groove 183 defined by the pedestal to the center position, overlying rod 179. When the pedestal is raised, rod 179 is raised further to engage projection 42 and to place lens blank 30 directly under the polishing head.

Figures 12A, 13:
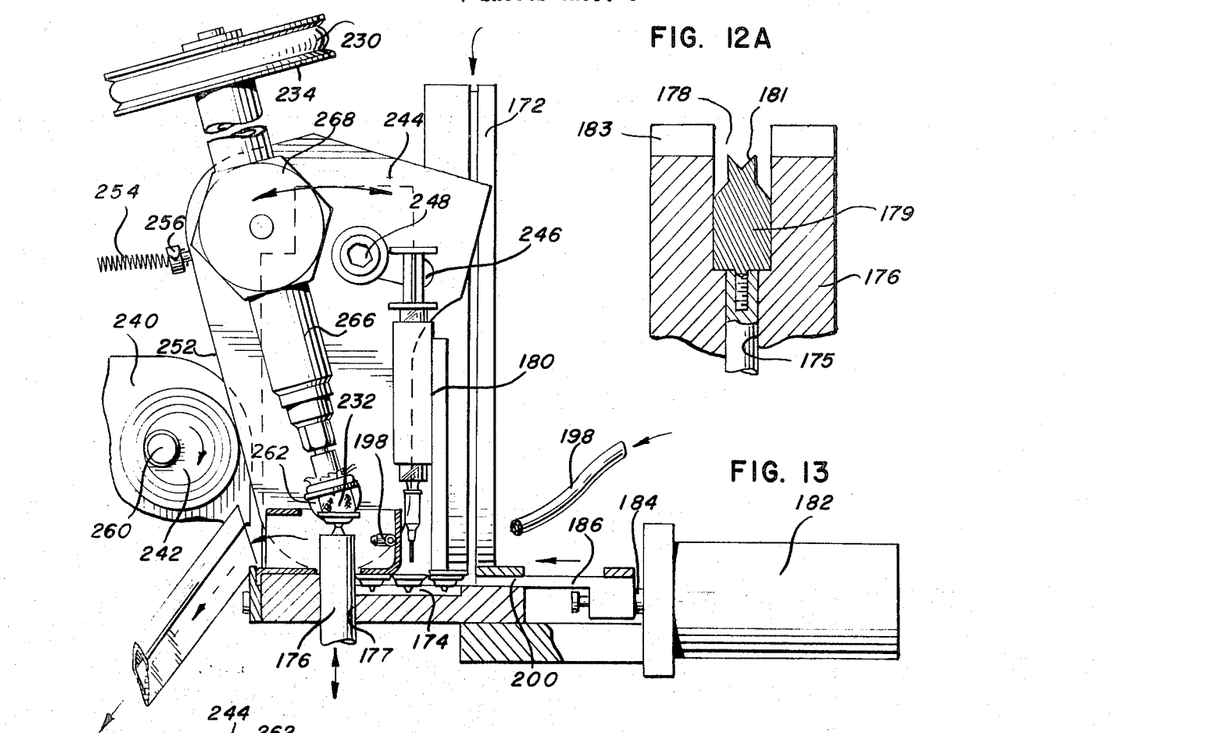
FIG. 12A is a greatly enlarged, fragmentary, cross-sectional view of the pedestal lift of the FIG. 11 apparatus.
FIG. 13 is an enlarged, fragmentary view thereof, taken along the line 13—13 of FIG. 11.

Prior to being forced onto platform 176, a predetermined amount of polishing compound is directed onto the unpolished base curve of the lens blank by means of an automatically actuated hypodermic-type syringe 180, most clearly shown in FIG. 13. Syringe 180 is adjusted to provide a certain number of drops of polishing compound per minute, and is synchronized with the movement of the blanks, which movement is timed.

The apparatus includes a piston device 182, the rod 184 of which is fastened to an arm 186 which operates to force a blank onto pedestal 176 when the pedestal is in its downward position. To actuate piston device 182, pedestal 176 is coupled to a lever 188 which pivots about pin 190 connected to standard 192 so as to cause member 194 to engage contact 196 when pedestal 176 is in its downward position. When member 194 engages contact 196, a circuit is completed so that air hose 198 is operated thereby blowing a lens blank off pedestal 176 and piston device 182 is actuated so that arm 186 will force another lens blank onto the lowered pedestal 176.

Figures 11, 12:
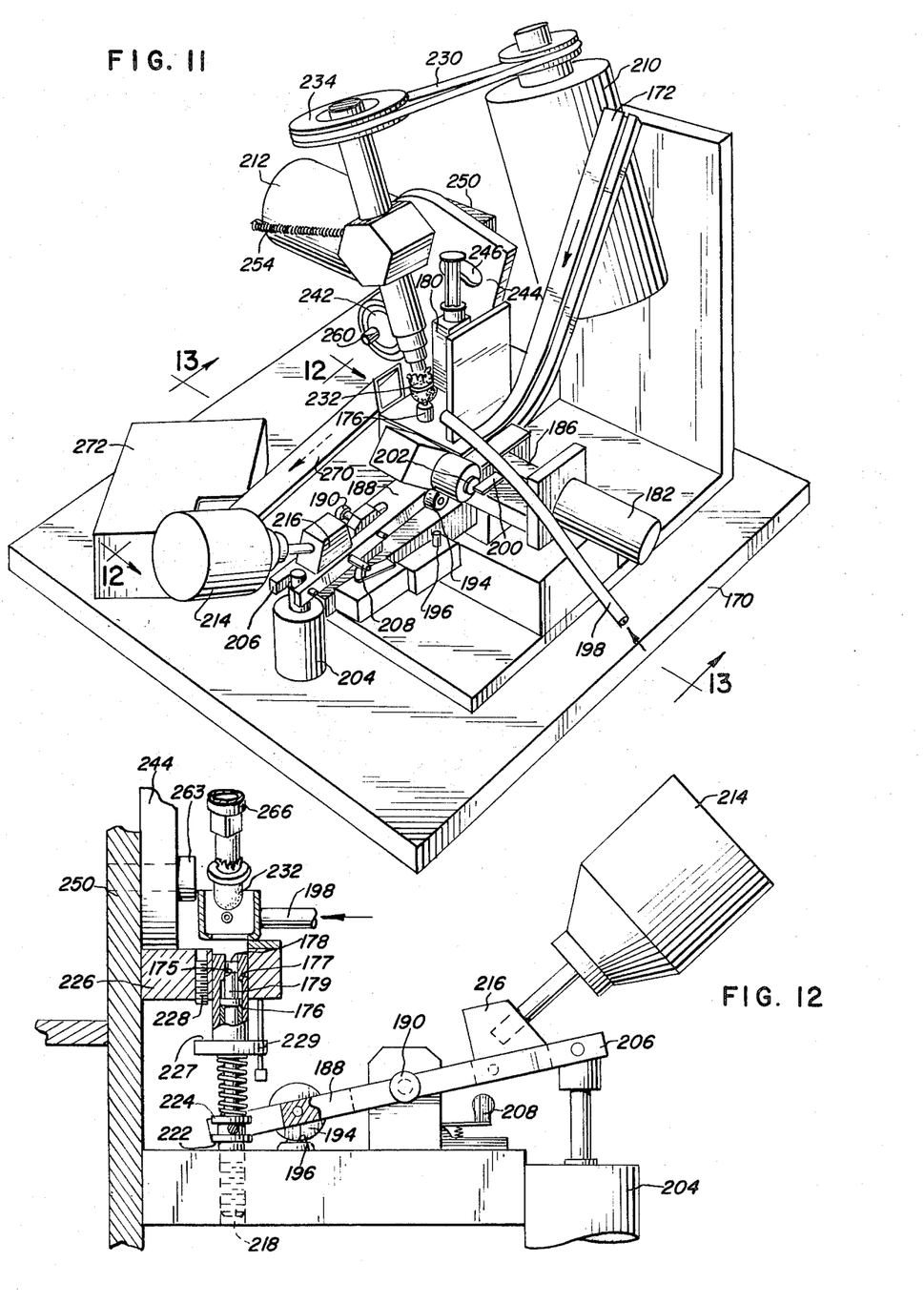
FIG. 11 is a perspective view of a base curve polishing apparatus constructed in accordance with the principles of the present invention.
FIG. 12 is an enlarged, fragmentary view thereof, taken along the line 12—12 of FIG. 11 (with the pedestal in its lowered position)
Figure 14:
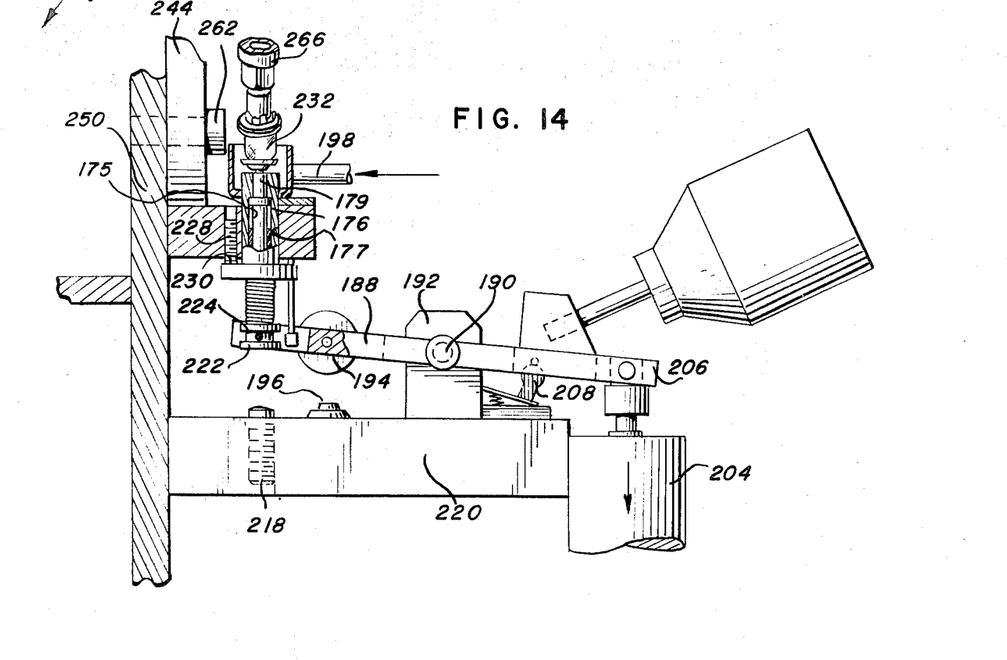
FIG. 14 is an enlarged, fragmentary view thereof, taken along the line 12—12 of FIG. 11 (with the pedestal in its raised position)

Referring to FIG. 11, it is seen that a laterally extending element 200 is connected to arm 186 so that once the arm has been extended to force a lens blank onto pedestal 176, element 200 will engage contacts 202 of a switch to operate a solenoid 204 thereby pulling downwardly the distal end 206 of lever 188 and causing the pedestal 176 and its associated rod 179 to be raised to the position shown in FIG. 14, in contrast to its lower position as shown in FIG. 12. When the lever is lowered, it will engage microswitch 208 to operate main polishing motor 210 and rocking motor 212. Lever 188 carries a counterbalancing weight 214 which is fastened to a standard 216 affixed to lever 188.

Referring to FIG. 14, it is seen that a set screw 218 is carried by base member 220 to engage the underside 222 of member 224 located at the bottom of pedestal 176, thereby limiting the downward travel of the pedestal 176. Referring to FIG. 12, it is seen that extension 226 carries a set screw 228 the bottom of which is engaged by top surface 227 of collar 229 to limit the upward movement of pedestal 176, although rod 179 will continue to move upwardly until the base curve of the lens blank engages the polishing head.

Polishing motor 210 drives a belt 230 which turns a polishing head 232 through the action of pulley 234. Polishing head 232 engages the base curve of lens blank 30 which lies upon rod 179 and the head 232 is caused to rock back and forth with respect to the stationary lens blank by means of motor 212 which operates through a gear reducer 240 to drive an eccentric cam 242, thereby providing rocker action. Referring to FIG. 13 in particular, it is seen that a rocker panel 244 defines a slot 246 through which bolt 248, connected to stationary plate 250, moves. The end 252 of rocker panel 244 is biased in the leftward direction (with respect to FIG. 13) by means of spring 254 connected between fastening member 256 and motor 212, to urge end 252 against the surface of cam 242. It can be seen that when the cam is in the position shown in FIG. 13 (with the greatest radial distance between pivot 260 and the cam end being toward rocker panel 244) rocker member 244, which rocks about pivot 262, is in its most rightward position (with respect to FIG. 13). Since polishing head 232 is connected to tool 266 which is rigidly fastened to the rocker panel 244 by connector 268, such camming will cause polishing head 232 to oscillate with oscillation of rocker panel 244.

After a predetermined time period has elapsed, pedestal 176 and its associated rod 179 will be lowered until member 194 engages contact 196, air will be forced through tube 198 to blow lens blank 30 (which is upon pedestal 176) into exit tube 270 which gravity-feeds the lens blank 30 having a polished base curve to a receptacle 272. Piston device 182 is actuated to force another lens blank 30 onto the lowered pedestal and, when extension 200 carried by arm 186 engages contact 202, solenoid 204 will be actuated to raise pedestal 176 so as to put the new unpolished lens blank into engagement with polishing head 232. Engagement of lever 188 with microswitch 208 once the pedestal is in its upper position will actuate motors 210 and 212 to commence the polishing and rocking operation.

Figure 15:
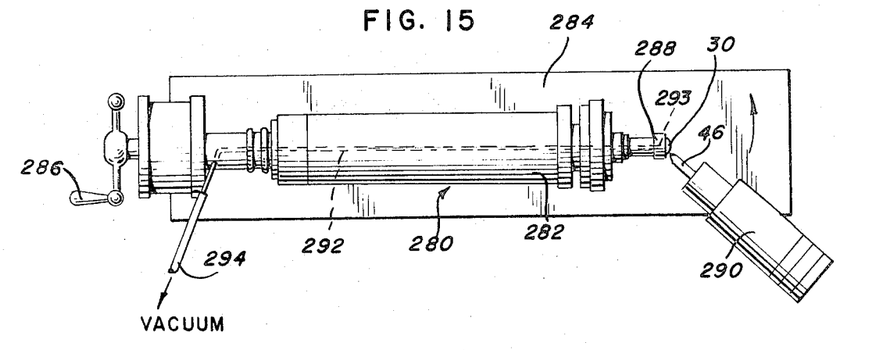
FIG. 15 is a diagrammatic view of apparatus for cutting the power curve of a contact lens blank in accordance with the principles of the present invention.

POWER CURVE FORMING APPARATUS (FIG. 15)

The power curve is cut on the lens blank by removing inclined portion 40 and projection 42 as shown in FIG. 3. Referring to FIG. 15, a cutting tool 46 is positioned adjacent a lens blank holding mechanism 280. Holding mechanism 280 comprises a cylinder 282 that is linearly movable with respect to platform 284 by turning handle 286, so as to place the lens blank 30 held by member 288 in a desired position with respect to tool 46. Tool 46 is carried by a tool holder 290 which pivots so as to cause tool 46 to cut a predetermined curve on the anterior surface of lens blank 30.

Cylinder 282 has a tube 292 running centrally therethrough with one end 293 of tube 292 communicating with member 288 and another portion 294 of tube 292 extending to a vacuum pump. In this manner, air at member 288 is evacuated through tube 292 when the vacuum pump is operated, to create a vacuum at the outlet of member 288 so that the base curve surface of lens blank 30 can be sucked against member 288 to thereby retain lens blank 30 in place for cutting the power curve, without the need to fasten the lens blank to the interior of a collet member which is often time consuming and burdensome. Hence when the power curve is to be generated on the lens blank, the lens blank is simply brought against member 288 with the base curve surface of the lens blank 30 facing member 288. The concavity of lens blank 30 in communication with the evacuated volume inside member 288 will provide a strong holding force for the lens blank against member 288 during the generation of the power curve.

Figure 16:
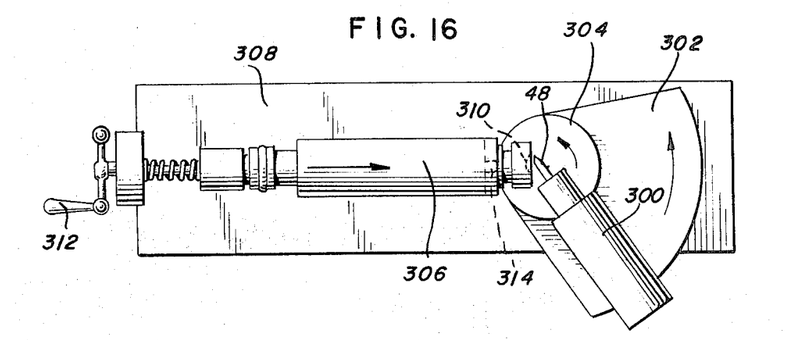
FIG. 16 is a diagrammatic view of apparatus for cutting the peripheral curve of a lens blank in accordance with the principles of the present invention.
Figure 17:
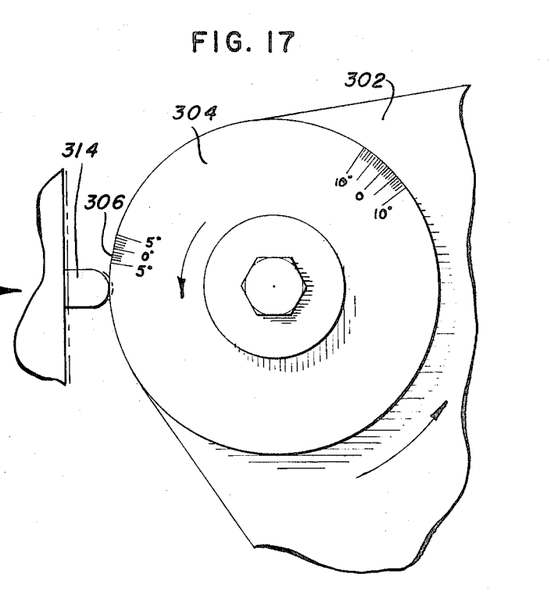
FIG. 17 is an enlarged, fragmentary view of a portion of the apparatus of FIG. 16.
Figure 18:
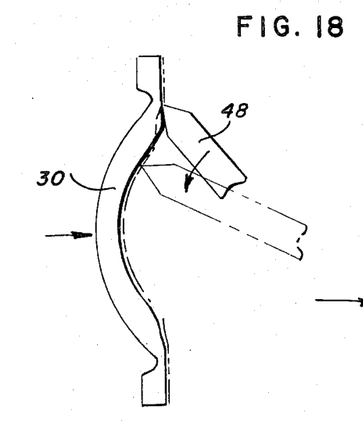
FIG. 18 is a diagrammatic view of the cutting of the peripheral curve utilizing the apparatus of FIG. 16.

PERIPHERAL CURVE GENERATOR (FIGS. 16-18)

A peripheral curve generating system is shown generally in FIG. 16. The peripheral curve is generated by cutting at the extremities of the base curve with a cutting tool 48, which cutting tool is grasped by a tool holder 300 that is fastened to a motor driven pivoting platform 302. A cam 304 having a camming surface 306 is affixed to the forward edge of the platform. Surface 306 is flattened and rounded in a predetermined manner so as to cam the lens blank into a predetermined relationship with the cutting tool 48 during pivoting of the cutting tool.

To this end, a blank holding member 306' which is movable laterally with respect to its platform 308 is provided for holding the lens blank during the peripheral curve cutting operation. Lens blank 30 is grasped by a suitable collet located within member 310 and member 306' is moved by turning handle 312 so that the lens blank is positioned in a selected location with respect to cutting tool 48. I have discovered that, if desired, the lens blank 30 can be held, during the peripheral curve cutting operation, with a vacuum holding device similar to that used in the power curve cutting operation of FIG. 15. Vacuum holding can be accomplished because of the surface provided by the underside of rim 38.

A cam follower 314 is fastened to the underside of member 306 so that member 306' will move laterally (to the left and right with respect to FIG. 16) in conformance with the action of follower 314 engaging surface 306 of cam 304.

It can be seen that as tool holder 300 is pivoted so as to inscribe a peripheral curve upon lens blank 30, surface 306 will engage follower 314 to move member 306' in a predetermined manner during pivoting of lens holder 300, thereby generating a peripheral curve in a selected mode. The peripheral curve generating apparatus of the present invention has been found to be extremely useful when generating peripheral curves which include an outside peripheral curve and an intermediate peripheral curve. Such complex configurations are in wide use in the contact lens art.

Figures 19, 22, 23, 24, 25:
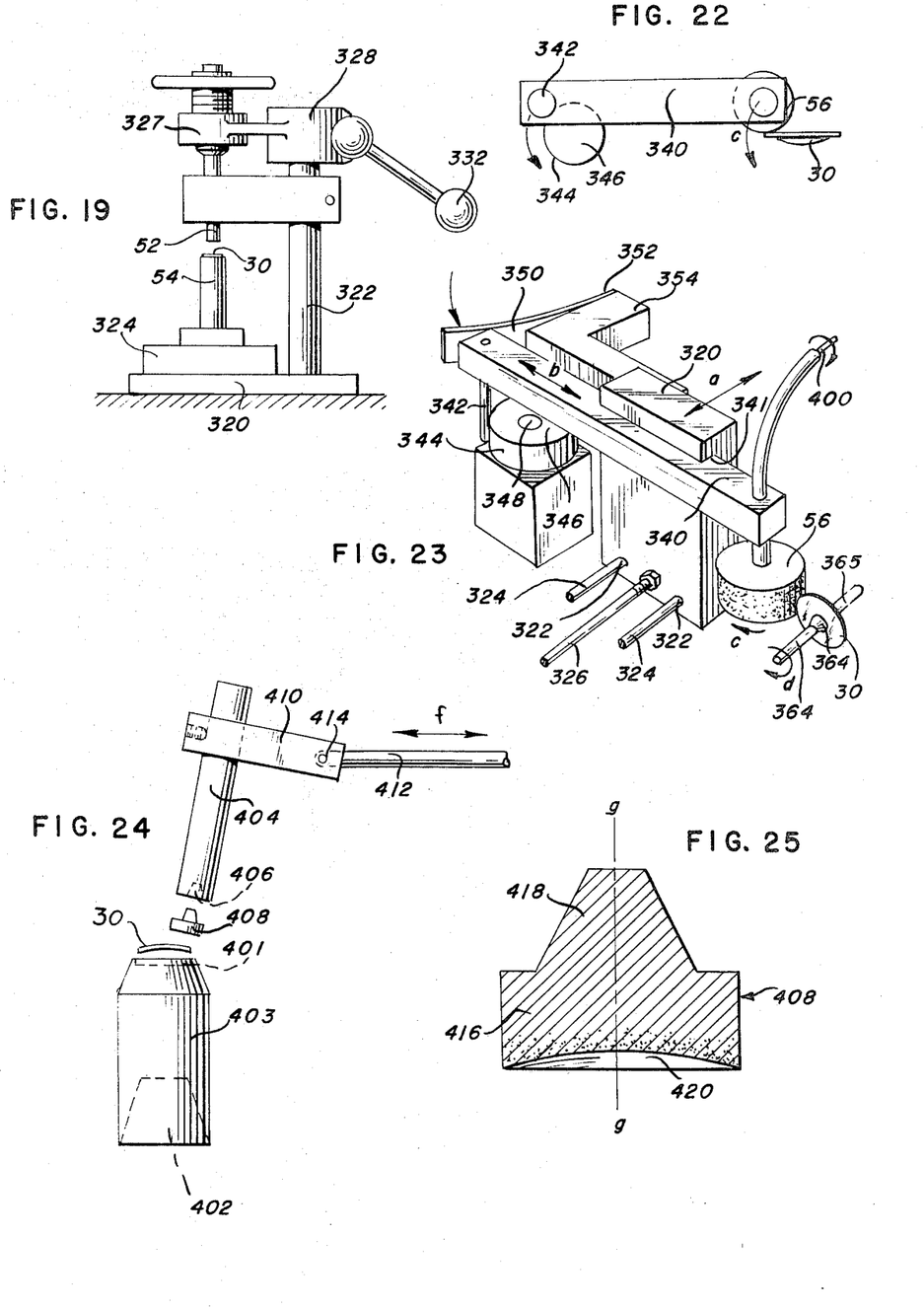
FIG. 19 is an elevational view of a punch constructed in accordance with the principles of the present invention.
FIG. 22 is a diagrammatic view of the polishing portion thereof.
FIG. 23 is a diagrammatic view of the mechanism for moving the polishing wheel in the apparatus of FIG. 20.
FIG. 24 is a diagrammatic view of apparatus for polishing the power curve in accordance with the principles of the present invention.
FIG. 25 is an enlarged view of the wood polishing member for polishing the power curve in accordance with the principles of the present invention.

PUNCHING OF LENS BLANK (FIG. 19)

After generating the peripheral curve, the lens blank is punched to remove an area of the blank adjacent its periphery. A typical punch is shown in FIG. 19 and includes a base 320 supporting an upright 322 and also supporting a platform 324 with blank holder 52 attached to platform 324. A punch press head 327 extends from slider 328 which is movable with respect to standard 322, but is keyed at a desired height to maintain head 327 in place with respect to punch 52. Head 327 has a downwardly extending die 54 extending therefrom which is shaped so as to punch lens blank 30 in a desired manner to remove a periheral portion of the blank therefrom. The punch is operated in a manner well-known in the prior art, by moving handle 332 to lower punch 54 into engagement with and through lens blank 30.

After the blank is punched, the peripheral curve is polished with a soft Velveteen pad and a polishing compound as is known in the art. The power curve is then polished, as described below, and the edge of the lens is polished as described immediately below.

CONTACT LENS EDGING APPARATUS (FIGS. 20–23)

An apparatus is provided for polishing the edge (the plastic surface between the base curve and the power curve) of a contact lens blank, which apparatus includes a cylindrical polishing wheel 56 that rotates about an axis that is perpendicular to the axis of rotation of a contact lens blank 30. Polishing wheel 56 is carried by an assembly which moves the axis of polishing wheel 56 in an arcuate manner, as shown in FIG. 22, so that wheel 56 will polish around the entire periphery of lens blank 30.

In order for the axis of wheel 56 to obtain an arcuate movement, it is necessary to provide simultaneous bidirectional force components in the directions of arrows $a$ and $b$ of FIG. 23, during rotation of wheel 56 (in the direction of arrow $c$) and rotation of lens blank 30 (in the direction of arrow $d$).

Figure 20:
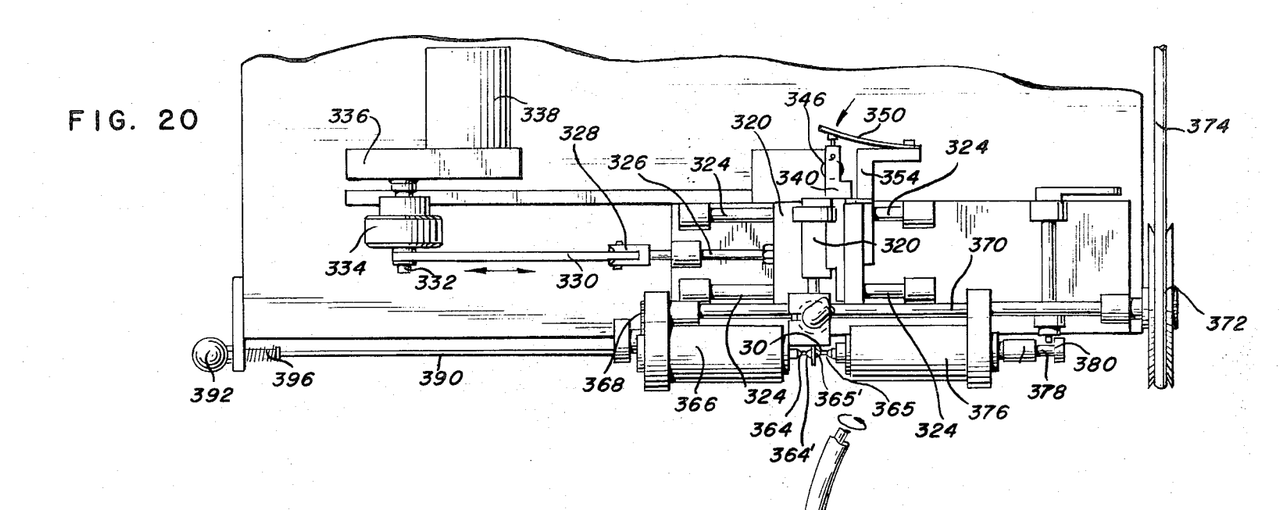
FIG. 20 is a top plan view of apparatus for polishing the lens edge of a substantially finished lens blank in accordance with the principles of the present invention.

Movement in the direction of arrow $a$ (FIG. 23) is accomplished by moving the holder 320 defining a pair of apertures 322 which allow holder 320 to slide along rods 324 as a result of the force applied against holder 320 in the direction of arrows $a$ by means of rod 326 which is affixed to holder 320. Referring to FIG. 20, rod 326 is coupled through a pivotable linkage 328 to crank 330 which is pivotally and eccentrically connected at 332 to rotating member 334. Rotating member 334 is coupled through gear reducer 336 to an electric motor 338 to drive crank 330 and thereby move holder 320 in the direction of arrows $a$.

To obtain movement of wheel 56 in the direction of arrows $b$, the wheel 56 is fastened to a bar 340 which dovetails at 341 within a slot defined by holder 320 to form a crank-type arrangement. A downwardly extending pin 342 engages the end surface 344 of a wheel 346, which wheel 346 has an eccentric pivot 348 causing wheel 346 to cam pin 342 in the direction of arrows $b$. Pin 342 is biased against surface 344 by means of a leaf spring 350 which is fastened at one end 352 to member 354, with member 354 being affixed to holder 320. It can thus be seen that when motor 338 is operating and wheel 346 is turning, polishing wheel 56 will be moved in an arcuate direction because of the orthogonal force components exerted against it in the directions of arrows $a$ and $b$.

Figure 21:
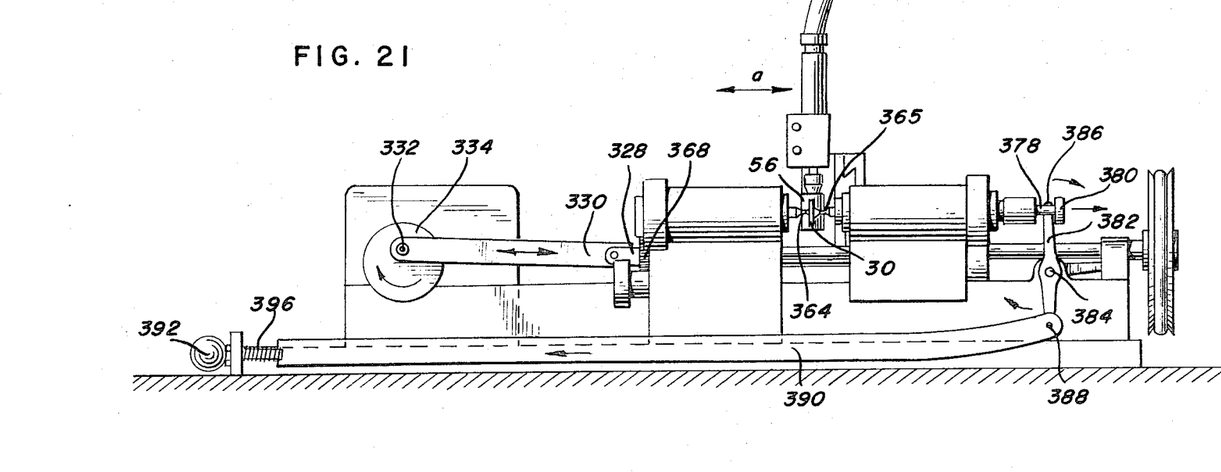
FIG. 21 is a side elevational view thereof.

Lens blank 30 is held between two rotatable shafts 364, 365 which have resilient cup-like members 364' and 365' at their distal ends. Shaft 364 is coupled through box 366 to a gearing arrangement 368, which gear 368 is driven by shaft 370 which itself is driven by pulley 372 and associated belt 374 connected to a suitable driving motor. Shaft 365 is connected through box 376 to a rod and retainers 378, 380. Shaft 365 will move in the rightward direction (with respect to FIGS. 20 and 21) when rod 378 moves in the rightward direction. Referring to FIG. 21 in particular, it is seen that an arm 382 having a central pivot 384 is fastened at one end 386 to rod 378 and at the other end 388 to an elongated rod 390 which, when moved in the leftward direction (with respect to FIGS. 20 and 21) will move arm 382 in a clockwise direction thereby pulling shaft 365 to the right, in order to release lens 30 or to permit insertion of a new lens blank 30. A manual handle 392 is provided for enabling the operator to pull rod 390 in the leftward direction (with respect to FIGS. 20 and 21).

It is seen that when the edge of a lens blank is to be polished, handle 392 is pulled in the leftward direction (with respect to FIGS. 20 and 21) and lens 30 is inserted between cups 364' and 365' at which time handle 392 is released to urge cup 365' against the blank 30 and force it into engagement with cup 364'. The arm 382 is normally biased in the counterclockwise direction by means of a spring 396.

The lens blank driving motor (not shown) is then actuated to move belt 374 and thus turn shaft 364 through gear 368, while shaft 365 idles. Motor 338 and the motor (not shown) which drives wheel 346 are energized to provide arcuate movement of the polishing wheel 56. The motor (not shown) connected to flexible shaft 400 which drives polishing wheel 56 is also energized to rotate wheel 56 while lens blank 30 is rotating and while the wheel 56 has imparted to it an arcuate motion with respect to the edge of the lens blank.

POWER CURVE POLISHING (FIGS. 24 AND 25)

In the apparatus for polishing the power curve of lens blank 30, the lens blank is held within recess 401 of member 403. Member 403 defines a centralized recess 402 at it undersurface for receiving a rotatable shaft. A holder 404 is provided and defines a centralized recess 406 at its undersurface for grasping a polishing member 408, which member is shown in detail in FIG. 25. Holder 404 has an arm 410 which is pivotally connected to link 412 at pivot 414 so that holder 404 will rock in response to movement of link 412 in the direction of arrows $b$.

Referring to FIG. 25, polishing member 408 comprises a member that is symmetrical about an axis g-g and includes a disc-shaped portion 416 and a crown portion 418. FIG. 25 shows polishing member 408 in vertical cross-section. Member 408 has a concave undersurface 420 which has a radius of curvature that is slightly greater than the radius of curvature of a typical power curve of a contact lens blank.

It has been found that a most effective polishing member 408 can be obtained by forming the polishing member from a soft wood, such as pine. The use of pine is advantageous because the wood is porous enough to become at least partially receptive to a liquid polishing compound, when member 408 is immersed into such a liquid polishing compound. When member 408 is connected to holder 404 and undersurface 420 engages the power curve of lens blank 30 during rotation of collet 401, an effective polishing action is provided by the wood undersurface of member 408 engaging the plastic power curve and having the polishing compound that has been retained by member 408 acting upon the power curve of the lens blank.

It is preferred that the power curve be polished prior to polishing the edge of the lens, although in some instances the edging may occur prior to polishing the power curve.

Although an illustrative embodiment of the invention has been shown and described, it is to be understood that various modifications and substitutions may be made by those skilled in the art without departing from the novel spirit and scope of the present invention.

What is claimed is:

1. In apparatus for forming contact lenses, the improvement comprising, in combination: means for underlying and supporting a contact lens blank having a base curve so that the base curve faces upwardly, said supporting means including a vertically movable base within a channel, rotating polishing means for polishing the base curve, said polishing means including a downwardly extending polishing tool for engaging the base curve, means for conveying the lens blank to said supporting means, said conveyor being positioned to convey a lens blank to said channel whereupon the blank will overlie said base, and means for moving said base upwardly to position the base curve adjacent said polishing tool.

2. Apparatus as described in claim 1, wherein said supporting means base includes a centrally located detent for receiving a downwardly extending protuberance from the undersurface of the lens blank.

3. In apparatus for forming contact lenses, the improvement comprising, in combination: means for underlying and supporting a contact lens blank having a base curve so that the base curve faces upwardly, polishing means for polishing the base curve, said polishing means including a downwardly extending polishing tool for engaging the base curve, means for rotating said polishing means, means for rocking said polishing means back and forth during rotation of said polishing means, and means for conveying the lens blank to said supporting means.

4. Apparatus as described in claim 3, including downwardly extending means for introducing polishing fluid to said base curve prior to polishing thereof.

5. In apparatus for forming contact lenses, the improvement comprising, in combination: means for underlying and supporting a contact lens blank having a base curve so that the base curve faces upwardly, polishing means for polishing the base curve, said polishing means including a downwardly extending polishing tool for engaging the base curve, means for rotating said polishing means with the axis of rotation of said polishing means being directed generally toward said lens blank, and means for conveying the lens blank to said supporting means.

* * * * *